(12) United States Patent
Dillon et al.

(10) Patent No.: US 7,922,189 B1
(45) Date of Patent: Apr. 12, 2011

(54) VEHICLE GRIP ASSIST HANDLE

(75) Inventors: Craig B. Dillon, Madison, MS (US); Wes Roy, Oakland, MI (US); Ron Morrow, Novi, MI (US); Lauren Parkins, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 12/722,286

(22) Filed: Mar. 11, 2010

(51) Int. Cl.
*B60R 21/213* (2006.01)
*B62D 39/00* (2006.01)

(52) U.S. Cl. ............... 280/728.1; 280/728.2; 280/730.2; 296/1.02; 16/110.1

(58) Field of Classification Search ............ 280/728.1, 280/728.2, 730.2; 296/1.02, 71; 24/297, 24/453, 458; 16/110.1, DIG. 40
See application file for complete search history.

(56) References Cited

U.S. PATENT DOCUMENTS

| | | | | |
|---|---|---|---|---|
| 6,302,434 | B2 * | 10/2001 | Nakajima et al. | 280/730.2 |
| 6,616,222 | B1 * | 9/2003 | Ponceau | 296/214 |
| 6,736,421 | B2 * | 5/2004 | Blake et al. | 280/730.2 |
| 6,761,374 | B2 * | 7/2004 | Di Sante et al. | 280/728.2 |
| 2001/0052693 | A1 * | 12/2001 | Mueller | 280/730.2 |
| 2002/0021014 | A1 * | 2/2002 | Sakuma et al. | 296/1.1 |
| 2005/0052001 | A1 * | 3/2005 | Totani et al. | 280/728.2 |
| 2007/0200380 | A1 * | 8/2007 | Stolarczyk et al. | 296/1.02 |
| 2007/0222192 | A1 * | 9/2007 | Yamagiwa et al. | 280/730.2 |
| 2008/0018128 | A1 * | 1/2008 | Yamagiwa et al. | 296/1.02 |
| 2009/0096193 | A1 | 4/2009 | Robins | |

OTHER PUBLICATIONS

Information on Nissan 09 Model—Interior Grip Assist.

* cited by examiner

*Primary Examiner* — Paul N Dickson
*Assistant Examiner* — Joseph Rocca
(74) *Attorney, Agent, or Firm* — Global IP Counselors, LLP

(57) ABSTRACT

A vehicle grip assist handle is provided with a grip assist body and a first gap hider. The grip assist body includes a gripping portion and a first attachment portion. The first gap hider is attached to the first attachment portion of the grip assist body. The first gap hider is configured to at least partially cover a first assist grip opening in a vehicle interior trim panel when the first attachment portion of the grip assist body is positioned in the first assist grip opening.

40 Claims, 19 Drawing Sheets

VEHICLE GRIP ASSIST HANDLE

BACKGROUND

1. Field of the Invention

The present invention generally relates to a vehicle grip assist handle of a vehicle body structure. More specifically, the present invention relates to a vehicle grip assist handle that projects through an interior trim panel.

2. Background Information

Vehicle structures are continually being improved for passenger safety. Most vehicles now include one or more airbags. Typically, an airbag includes inflatable member that when deployed creates a cushioning bag or cushioning curtain to protect a passenger or passengers during impact events. Airbags are often installed in pillar structures within certain vehicles. For example, an airbag is sometimes installed in an A-pillar of the vehicle such that when the airbag inflates a cushioning curtain is formed between the vehicle passenger and a door and/or a portion of an interior roof of the vehicle. Many vehicles include an assist grip handle to assist passengers in entering and exiting the vehicle. These assist grip handles are often mounted to portions of pillars and/or roof rails that are next to a door opening. Typically, the assist grip handles are securely mounted to metal structural elements of the vehicle body with fasteners that extend through apertures in trim panels. Trim panels are usually provided over the metal structural elements of the vehicle body with the assist grip handles projecting through the trim panels to provide an attractive appearance. When an airbag is installed beneath a trim panel with an assist grip handle projecting through the trim panel, the trim panel needs to easily release from the metal structural element of the vehicle body upon deployment of the airbag. The interface between the trim panel and the assist grip handle should be configured such that the assist grip handle does not obstruct the deployment of the airbag.

SUMMARY

In view of the state of the known technology, one aspect of the present invention is to provide an interface between a vehicle interior trim panel and an assist grip handle that desensitizes the gap condition between the vehicle interior trim panel and the assist grip handle while allowing the vehicle interior trim panel to easily release from the metal structural element of the vehicle body upon deployment of the airbag.

In order to carry out this aspect of the present invention, a vehicle grip assist handle is provided that mainly comprises a grip assist body and a first gap hider. The grip assist body includes a gripping portion and a first attachment portion. The first gap hider is attached to the first attachment portion of the grip assist body. The first gap hider is configured to at least partially cover a first assist grip opening in a vehicle interior trim panel when the first attachment portion of the grip assist body is positioned in the first assist grip opening.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
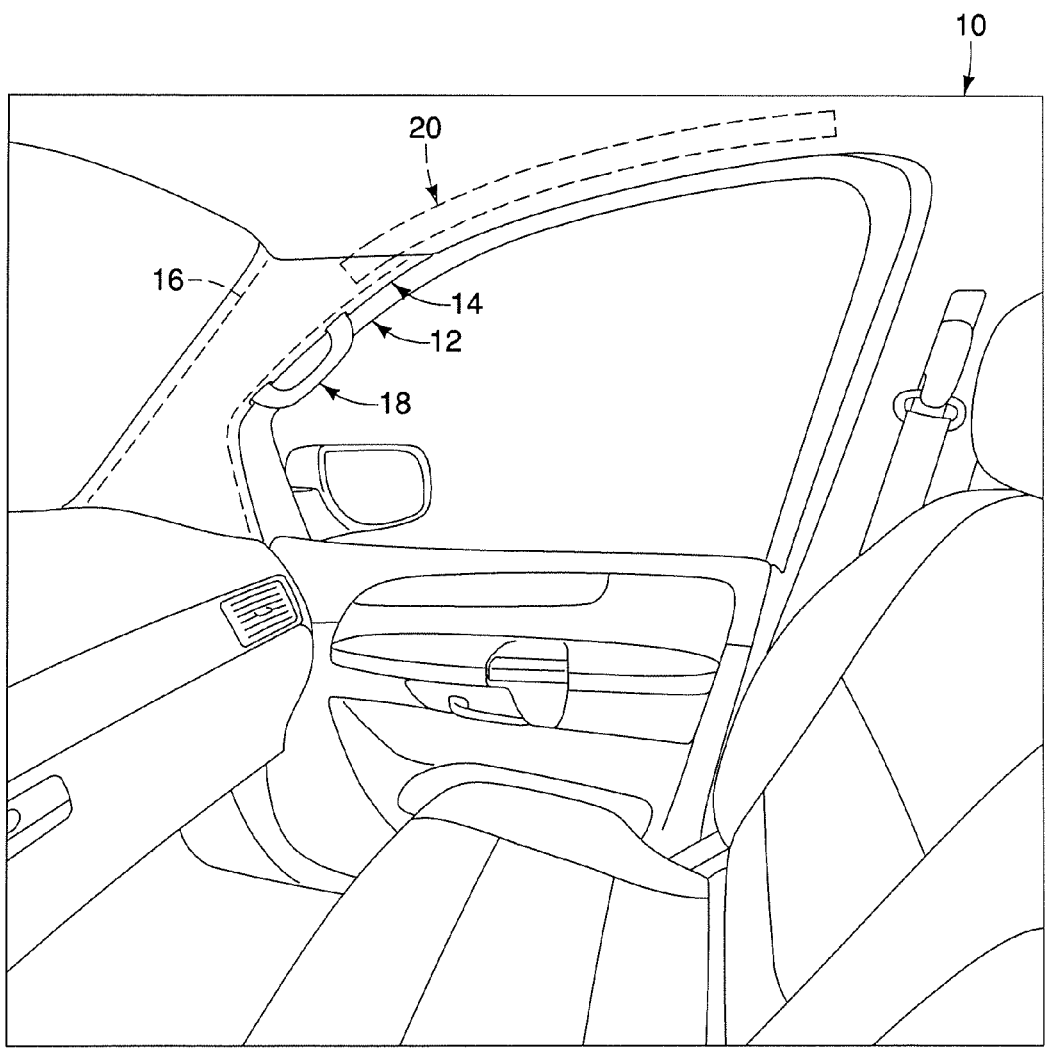
FIG. 1 is a perspective view of an interior portion of a vehicle that has a vehicle body structure with a vehicle grip assist handle and a vehicle interior trim panel in accordance with an illustrated embodiment.
Figure 2:
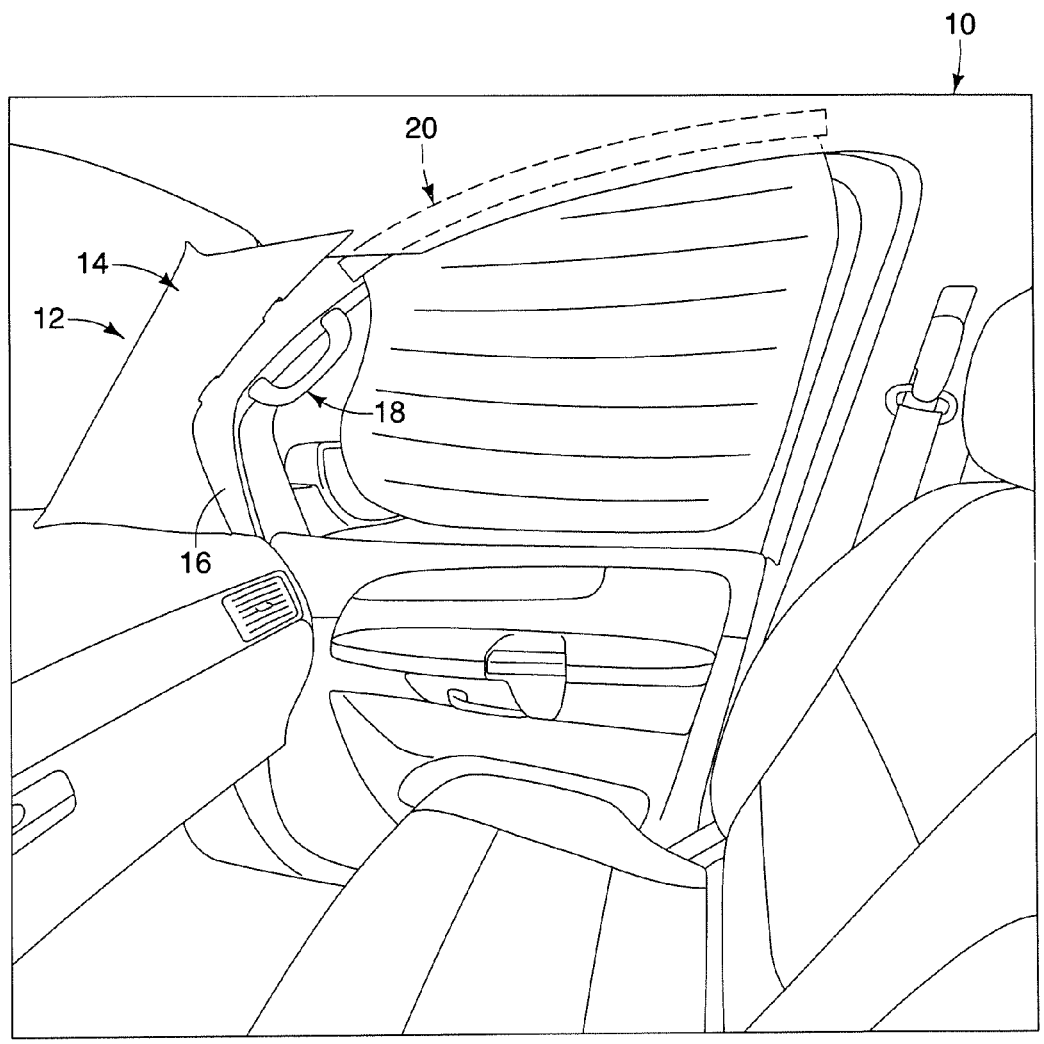
FIG. 2 is a perspective view of the interior portion of the vehicle illustrated in FIG. 1 with the airbag deployed and the vehicle interior trim panel in a detached position.

Referring initially to FIGS. 1 and 2, an interior portion of a vehicle 10 is illustrated that has a vehicle body structure 12 that includes a vehicle interior trim panel 14 in accordance with an illustrated embodiment. The vehicle body structure 12 further includes a pillar 16 and an assist grip handle 18. An airbag 20 is disposed between the vehicle interior trim panel 14 and the pillar 16. In the illustrated embodiment, the assist grip handle 18 is securely attached to the pillar 16, which constitutes a structural vehicle body section of the vehicle 10. The trim panel 14 covers the pillar 16, the airbag 20 and the connection of the assist grip handle 18 to the pillar 16. The assist grip handle 18 provides an assist grip that helps passengers get in and out of the vehicle 10. As shown in FIGS. 1 and 2, the pillar 16 is an A-pillar of the vehicle 10. Of course, the vehicle body structure 12 can be employed in other areas of the vehicle 10. The trim panel 14 is releasably secured to the pillar 16 such that the trim panel 14 moves away from the pillar 16 in response to deployment of a concealed airbag 20. In the illustrated embodiment, the assist grip handle 18 remains attached to the pillar 16 after deployment of the airbag 20.

Figure 3:
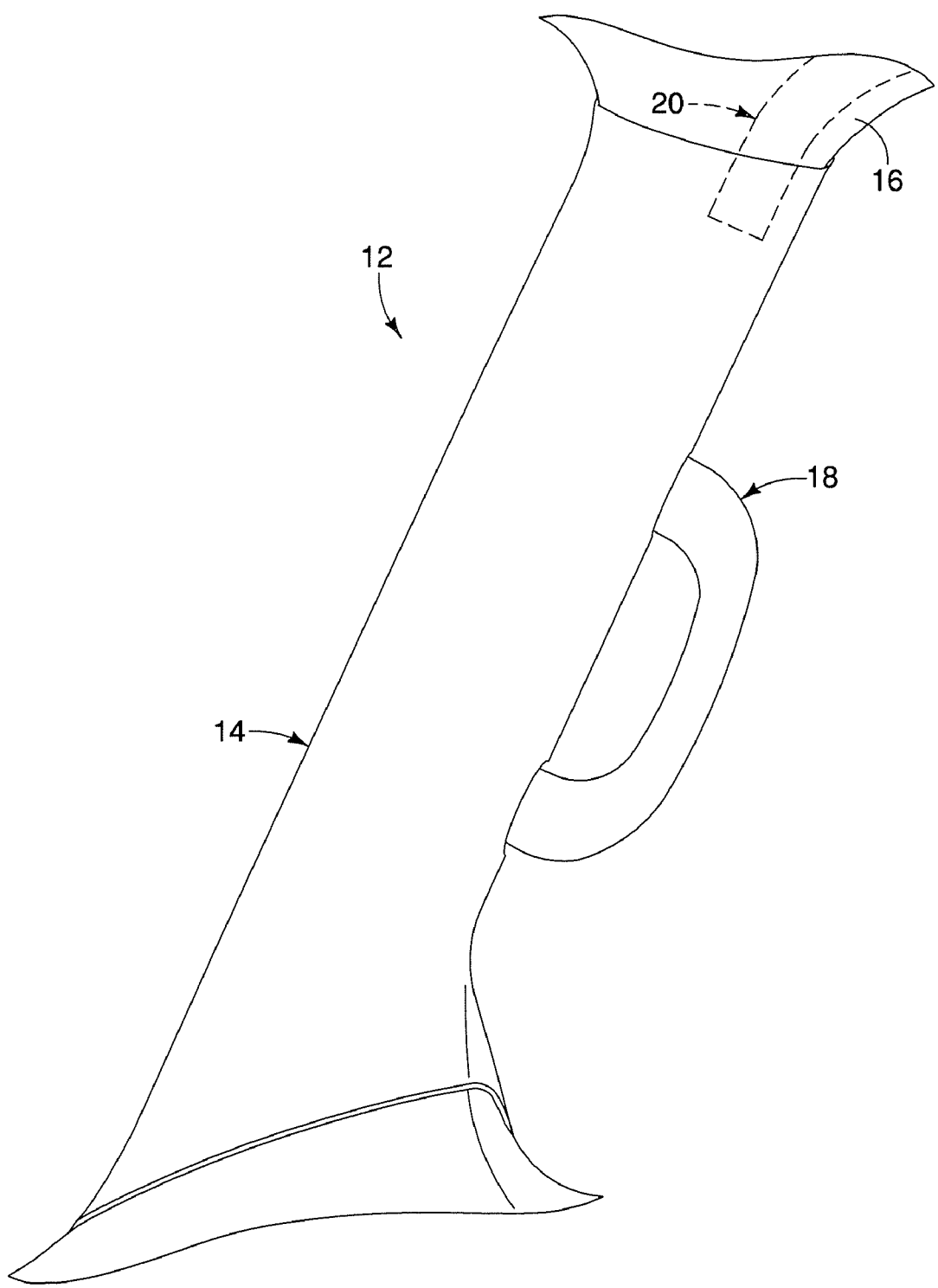
FIG. 3 is an enlarged elevational view of the A-pillar of the vehicle with the assist grip handle and the vehicle interior trim panel mounted on the A-pillar of the vehicle.
Figure 4:
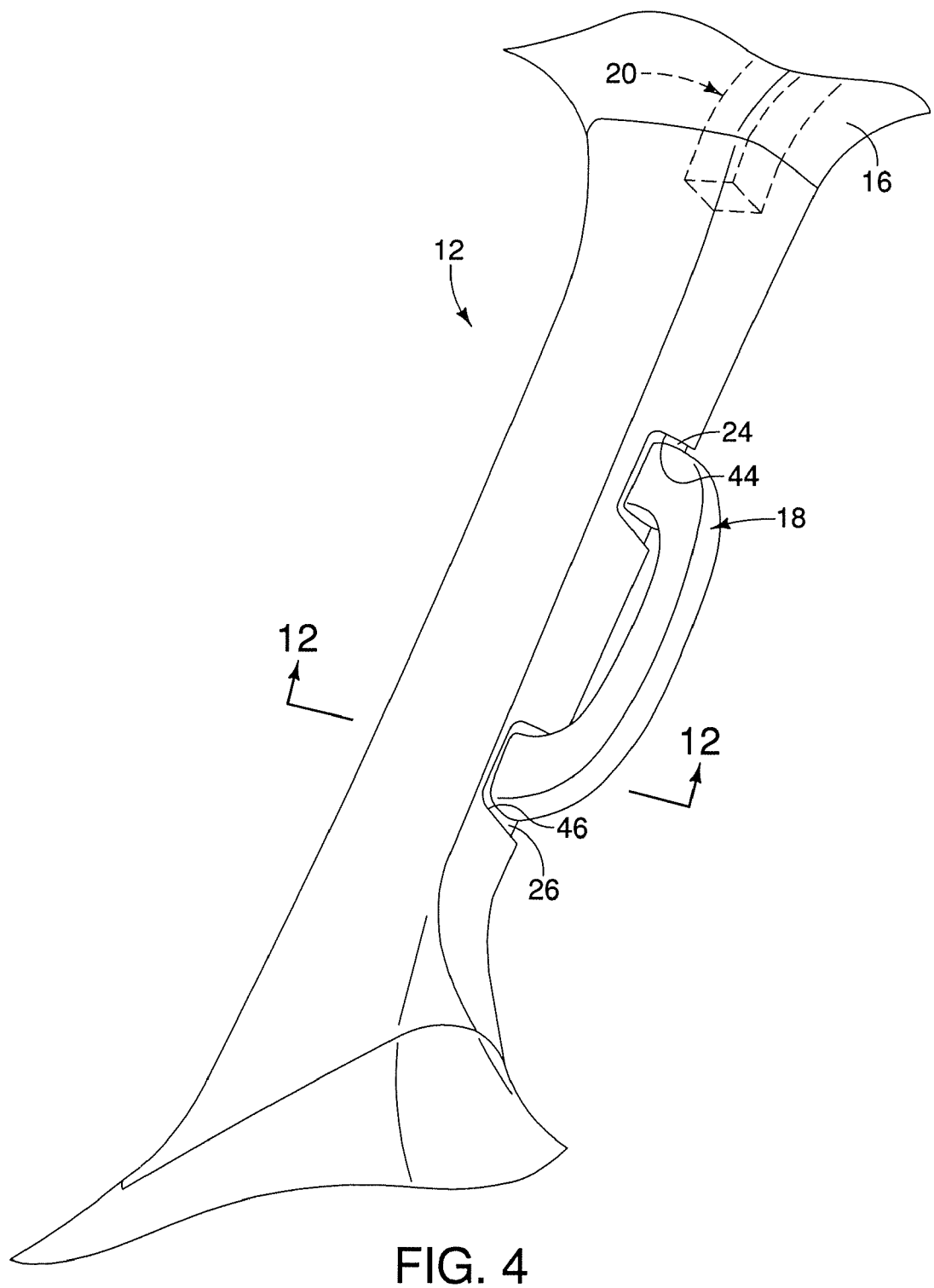
FIG. 4 is a perspective view of the A-pillar of the vehicle with the assist grip handle and the vehicle interior trim panel mounted on the A-pillar of the vehicle.

As seen in FIGS. 1, 3 and 4, the trim panel 14 is configured to overlay a portion of the pillar 16 and conceal the airbag 20. As seen in FIG. 2, the trim panel 14 is also configured to at least partially breakaway from the pillar 16 in response to deployment (inflation) of the airbag 20. In particular, the trim panel 14 moves away from the pillar 16 by a sufficient distance away from the pillar 16 to allow full deployment of the airbag 20. In the illustrated embodiment, the trim panel 14 is restrained from moving away from the pillar 16 by no more than a predetermined distance as mentioned below.

As seen in FIGS. 5 to 11, the grip assist handle 18 is provided with a first flexible gap hider 24 and a second flexible gap hider 26. The first and second flexible gap hiders 24 and 26 are attached to the grip assist handle 18. The first and second flexible gap hiders 24 and 26 are configured and arranged to completely cover the gaps formed between the trim panel 14 and the vehicle grip assist handle 18. In other words, with the trim panel 14 secured to the pillar 16, the first and second flexible gap hiders 24 and 26 contact the trim panel 14 to fill any gap occurring in the interface between the assist grip handle 18 and the trim panel 14.

Figure 7:
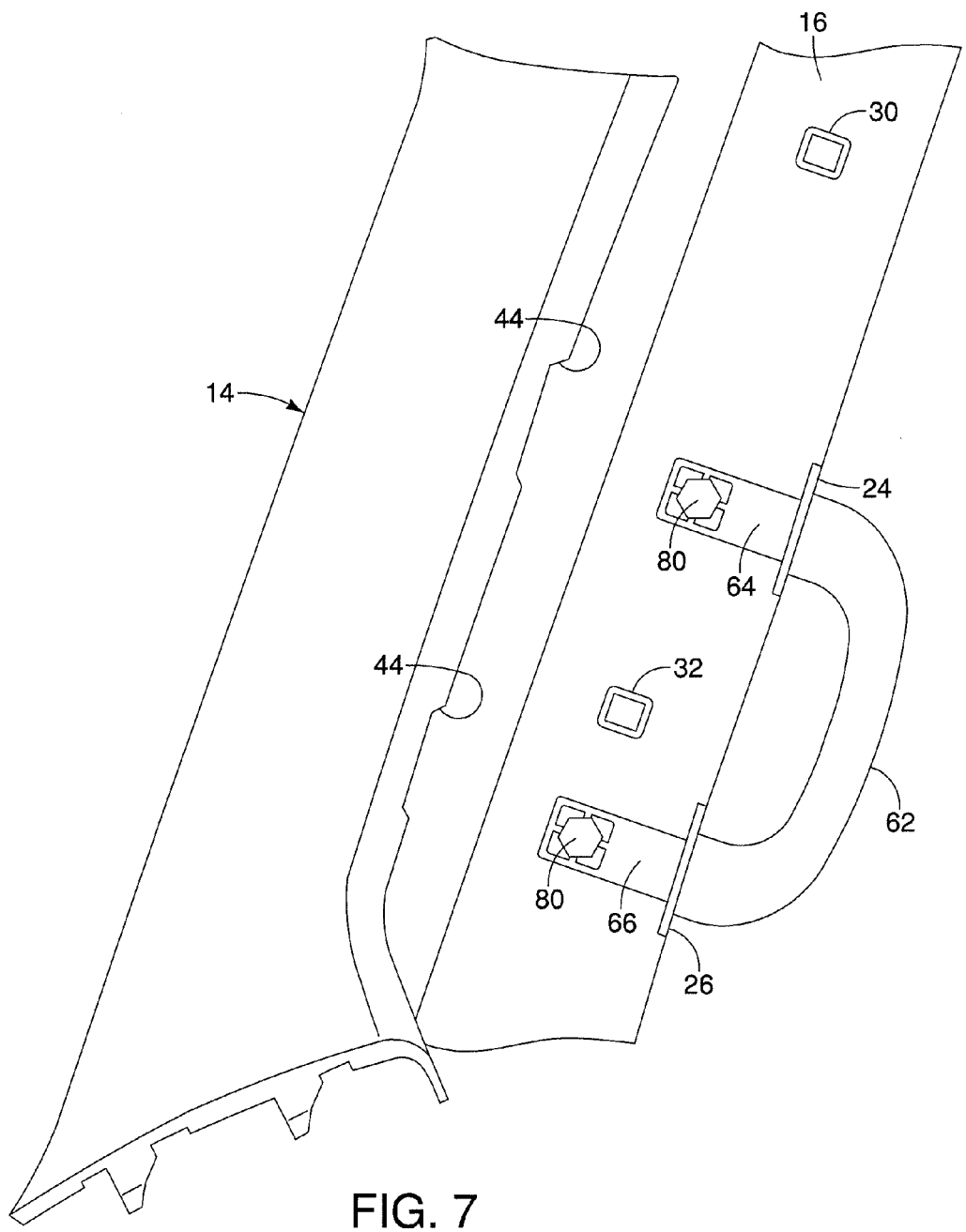
FIG. 7 is an exploded perspective view of the A-pillar of the vehicle and the vehicle interior trim panel with the assist grip handle mounted on the A-pillar of the vehicle.
Figure 8:
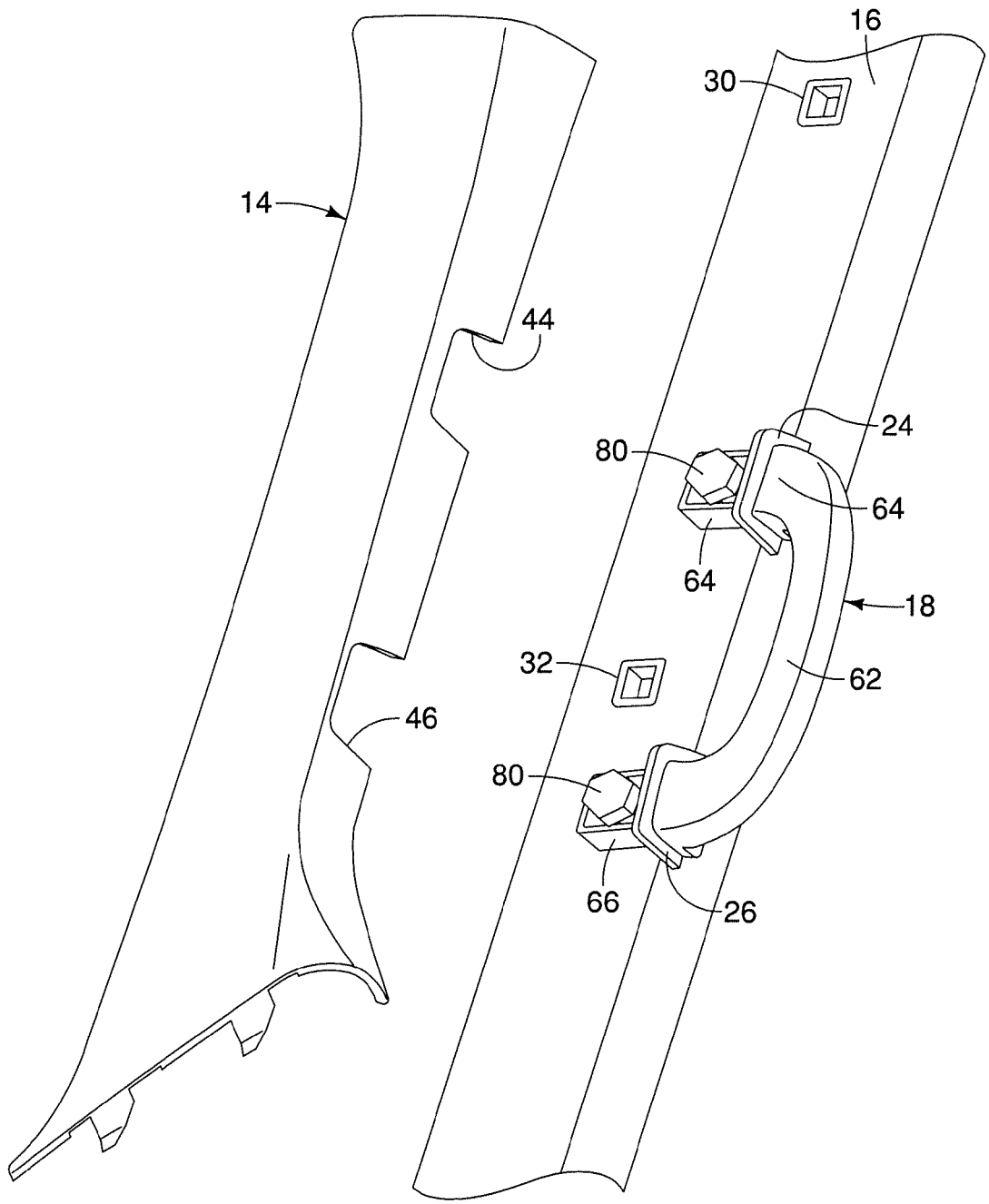
FIG. 8 is an exploded perspective view of the A-pillar of the vehicle and the vehicle interior trim panel with the assist grip handle mounted on the A-pillar of the vehicle.
Figure 9:
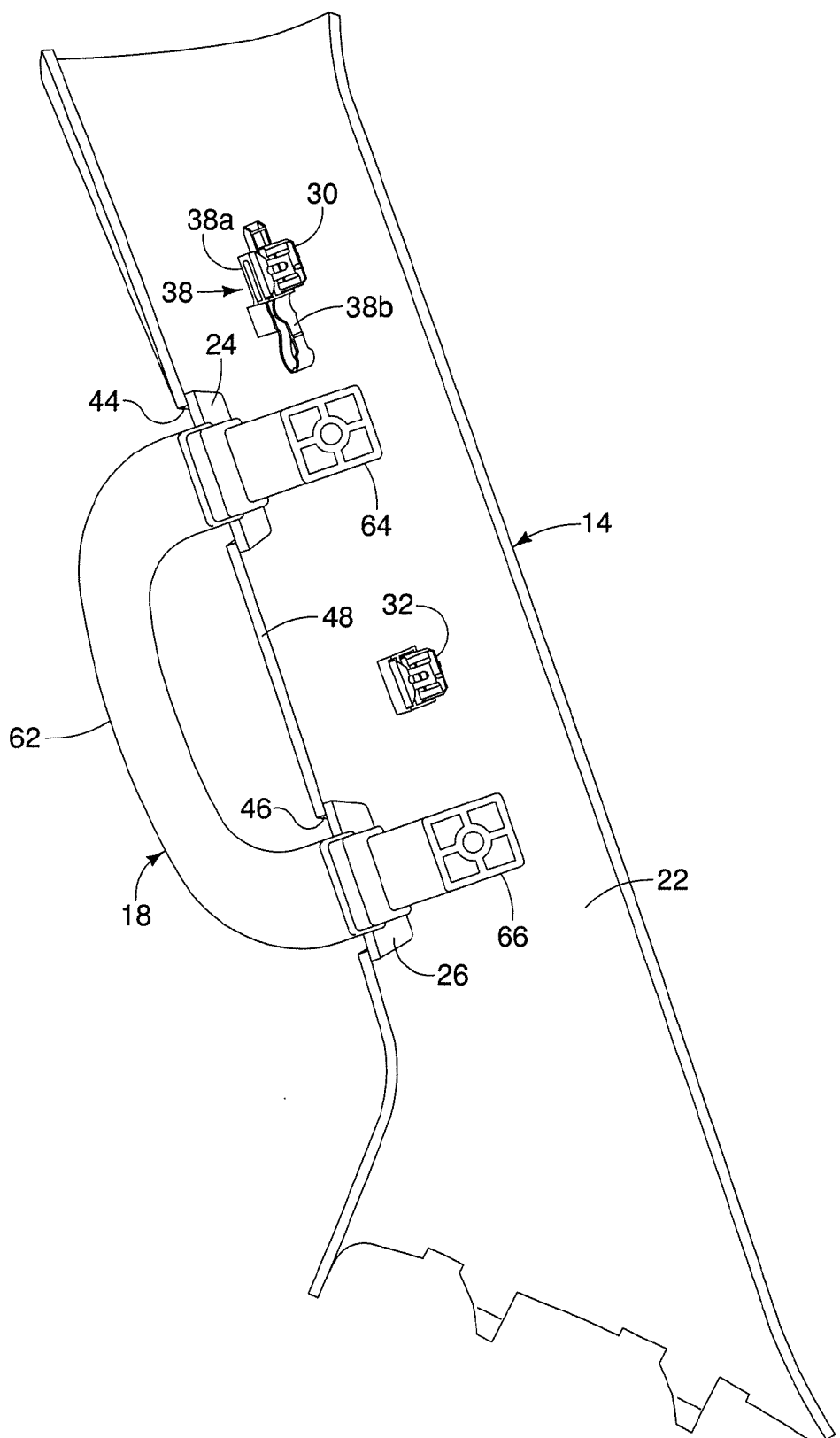
FIG. 9 is an elevational view of the hidden backside surface of the vehicle interior trim panel and the assist grip handle.
Figure 10:
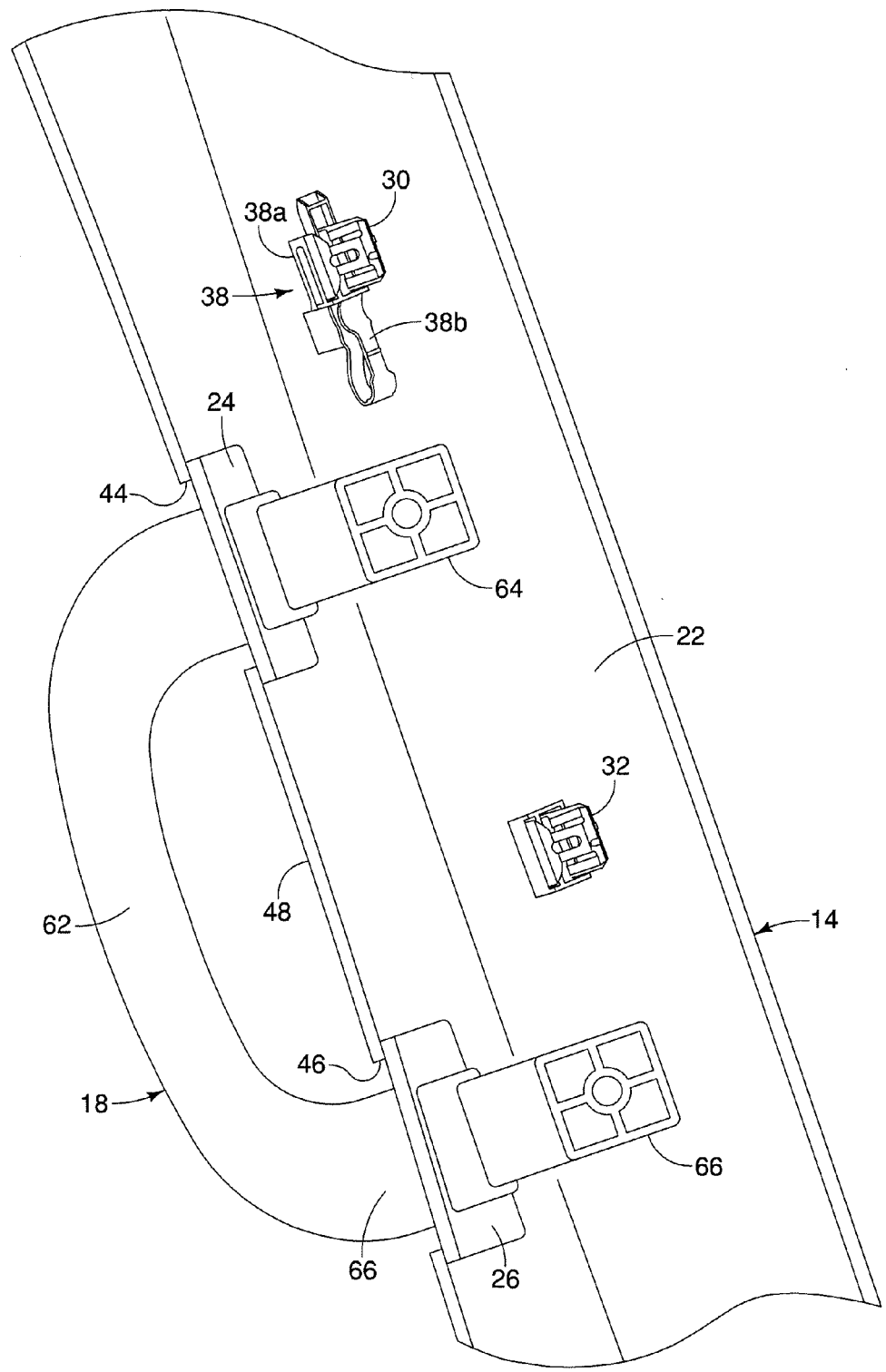
FIG. 10 is an enlarged perspective view of the hidden backside surface of a portion of the vehicle interior trim panel and the assist grip handle.
Figure 11:
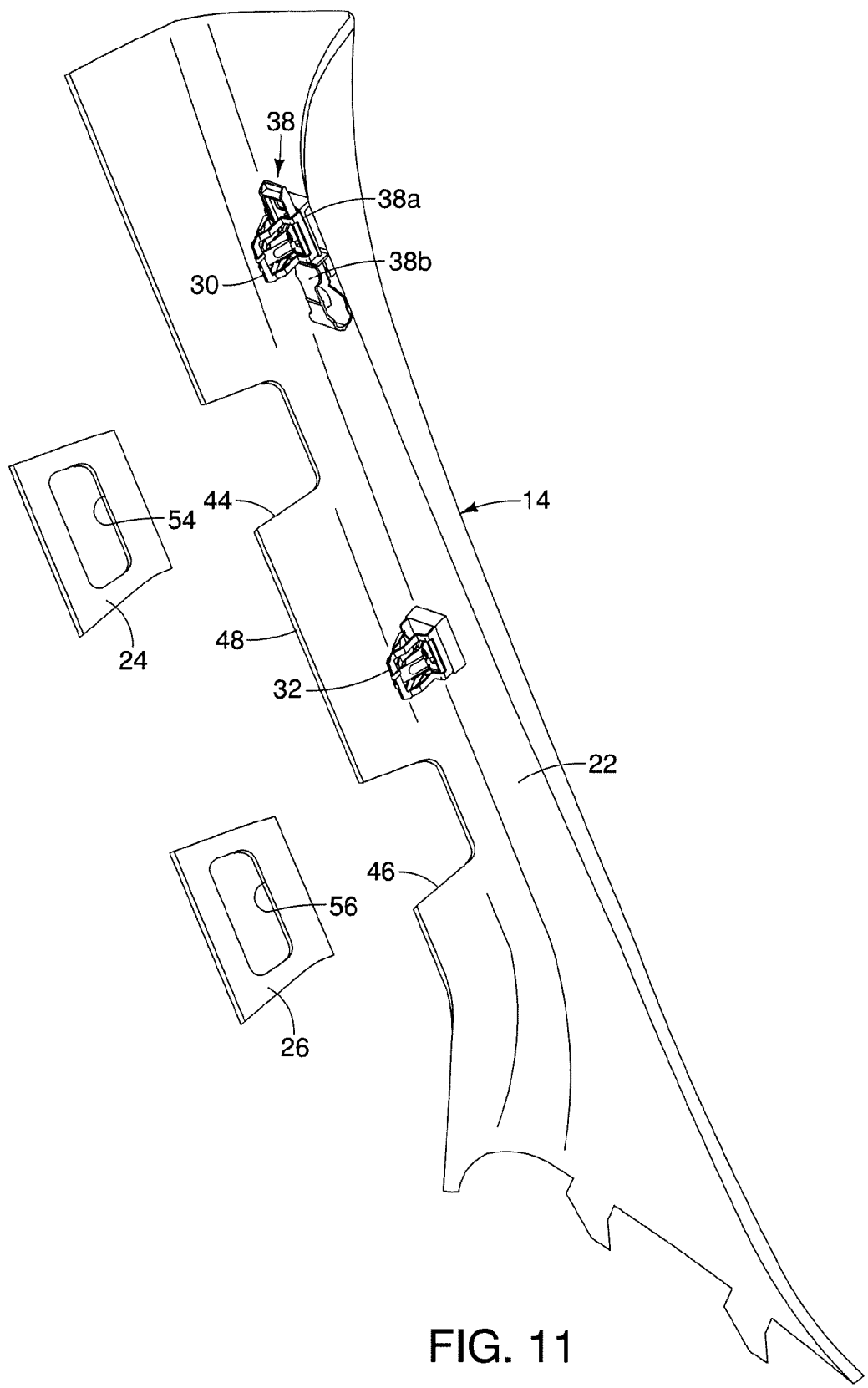
FIG. 11 is a perspective view of the hidden backside surface of the vehicle interior trim panel.
Figure 12:
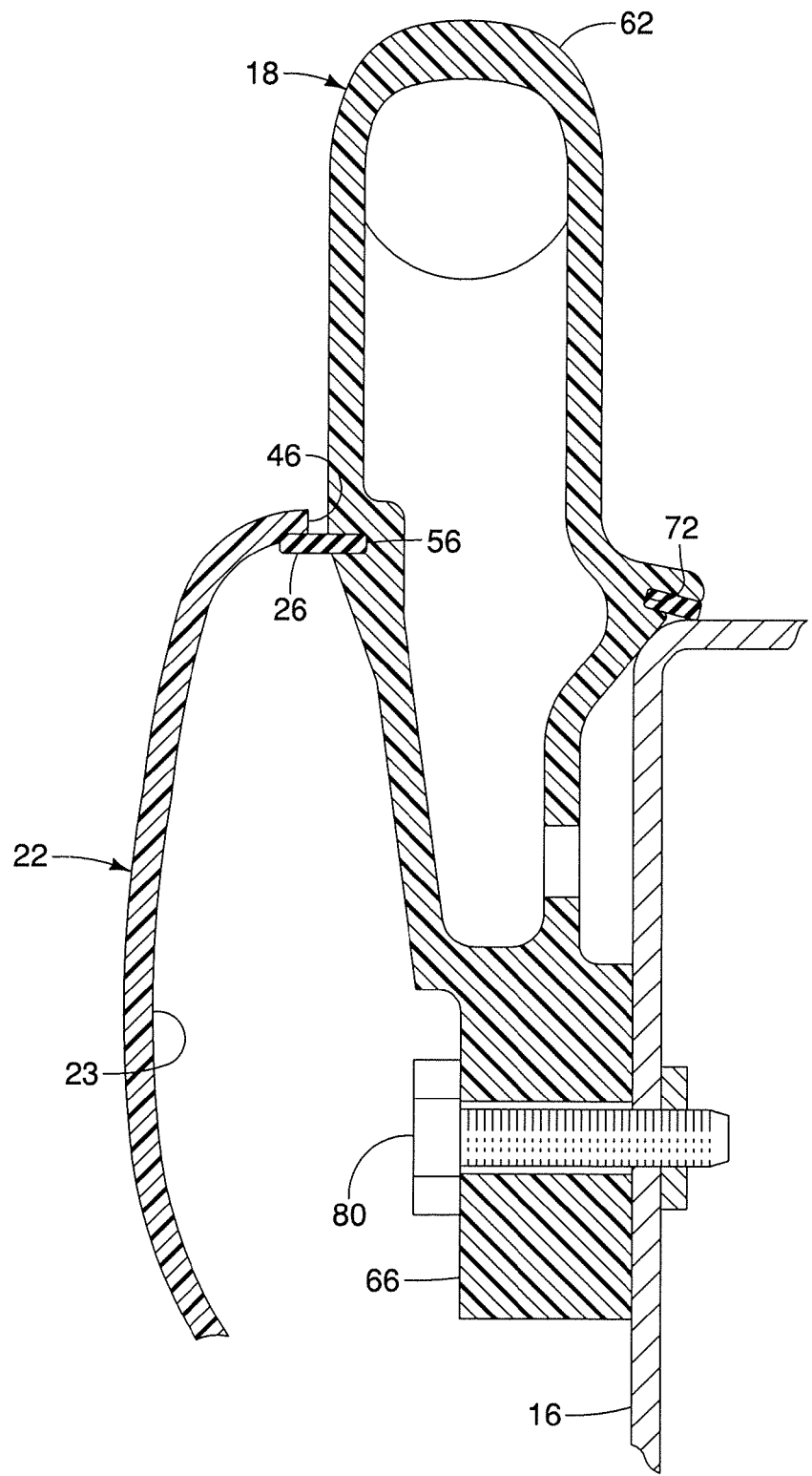
FIG. 12 is a cross sectional view of the vehicle interior trim panel and the assist grip handle as seen along section line 12-12 of FIG. 4.
Figure 13:
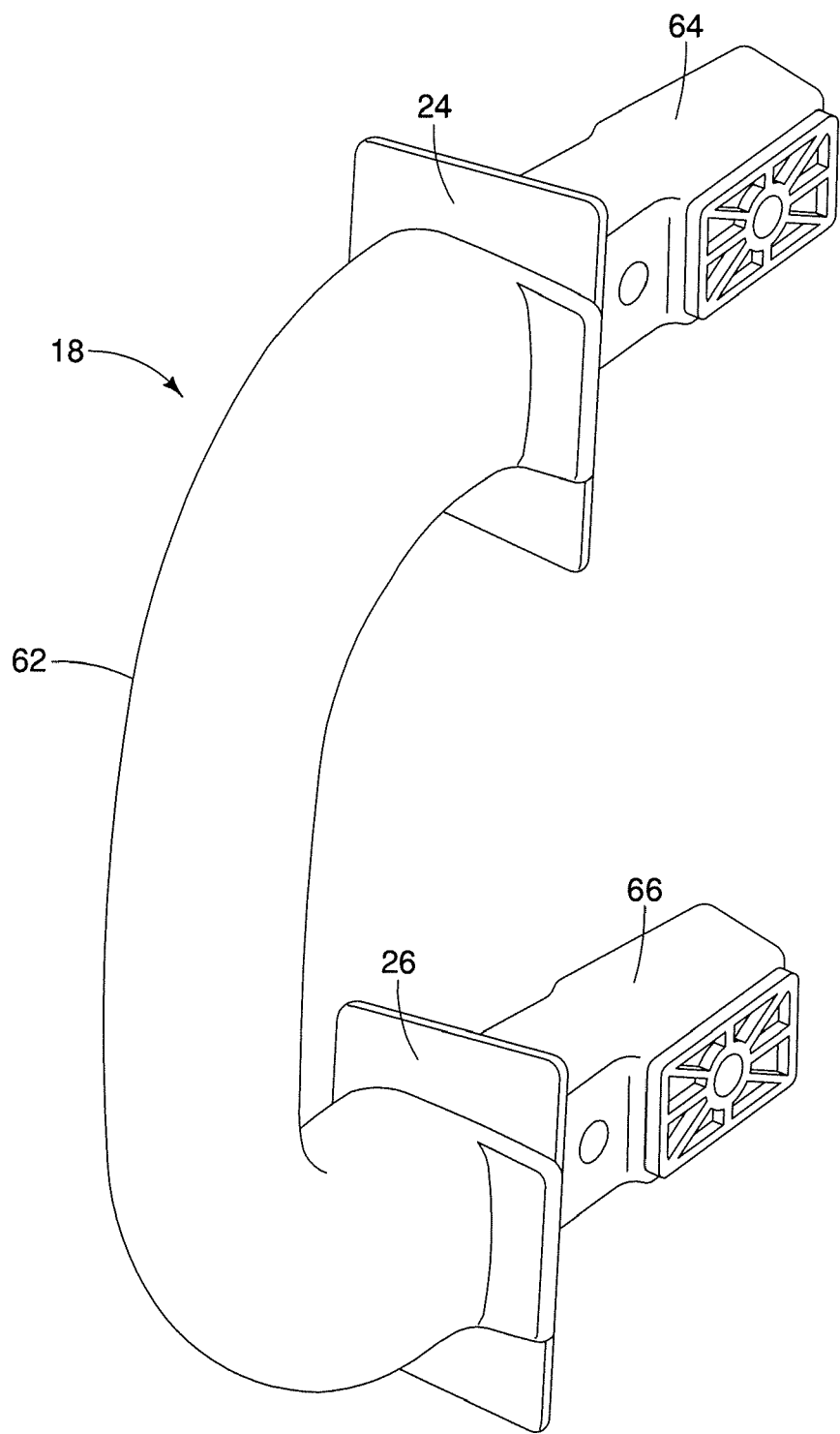
FIG. 13 is a first side perspective view of the assist grip handle with the first and second flexible gap hiders attached to the grip assist handle.
Figure 14:
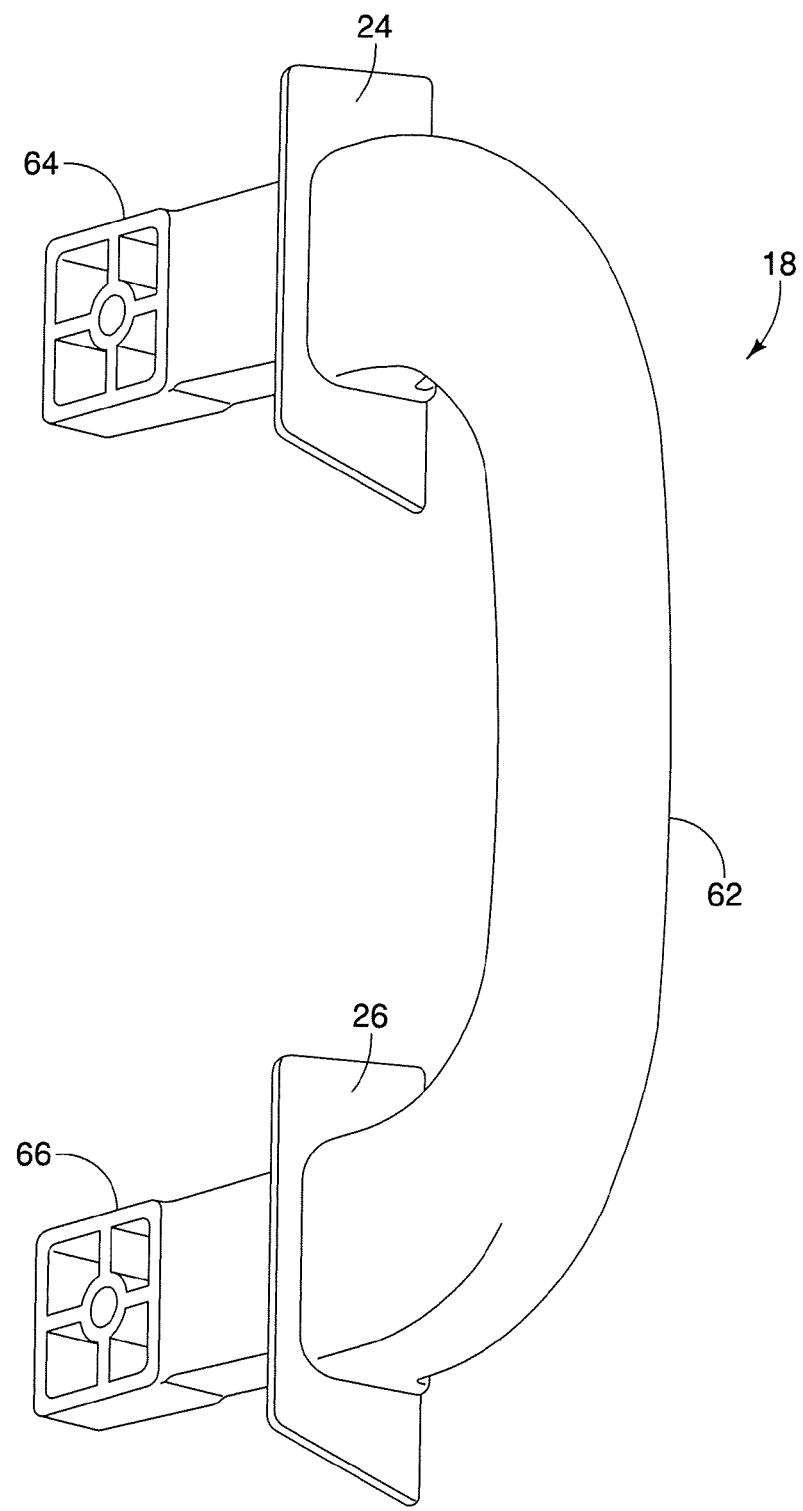
FIG. 14 is a second side perspective view of the assist grip handle with the first and second flexible gap hiders attached to the grip assist handle.
Figure 15:
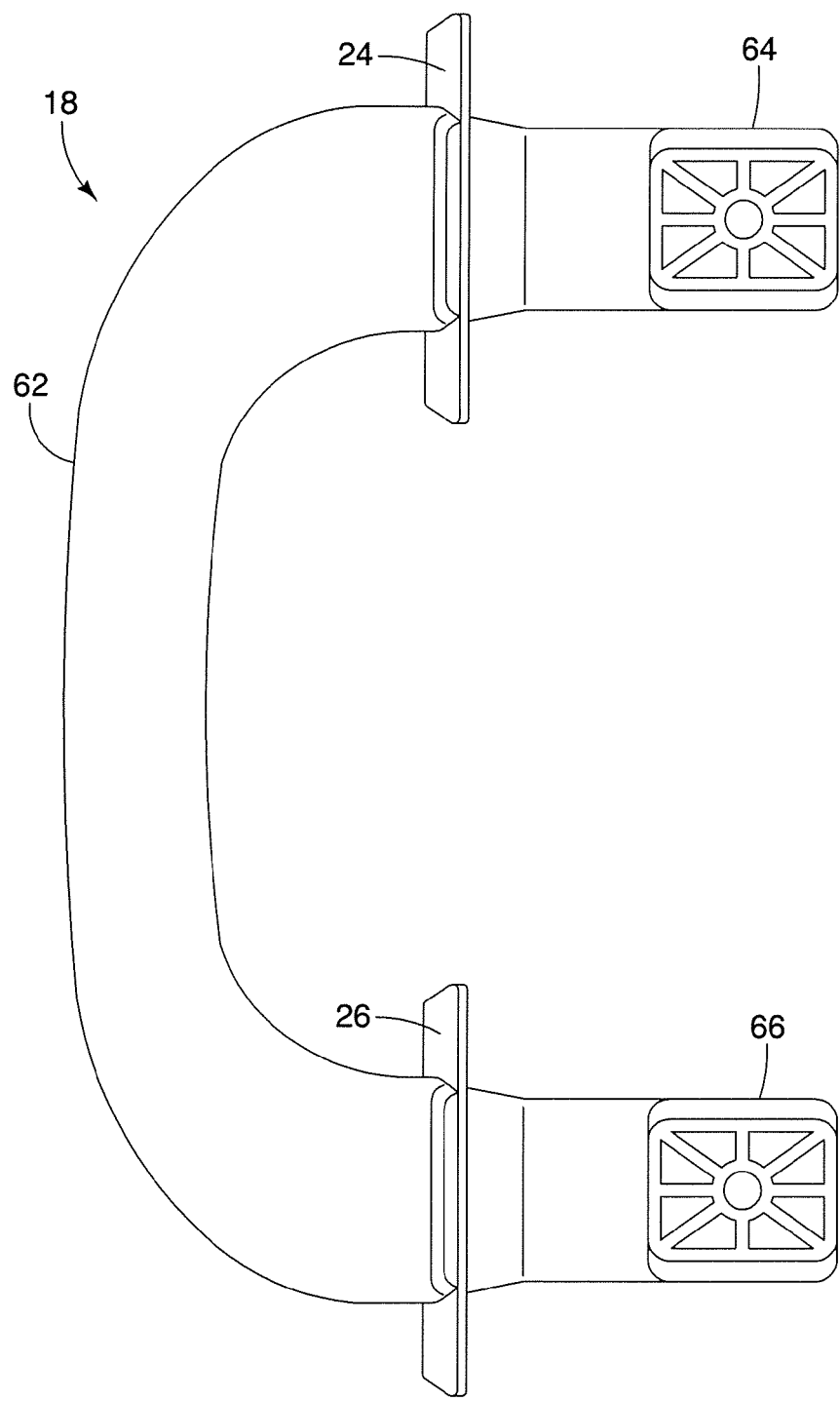
FIG. 15 is a side elevational view of the assist grip handle with the first and second flexible gap hiders attached to the grip assist handle.
Figure 16:
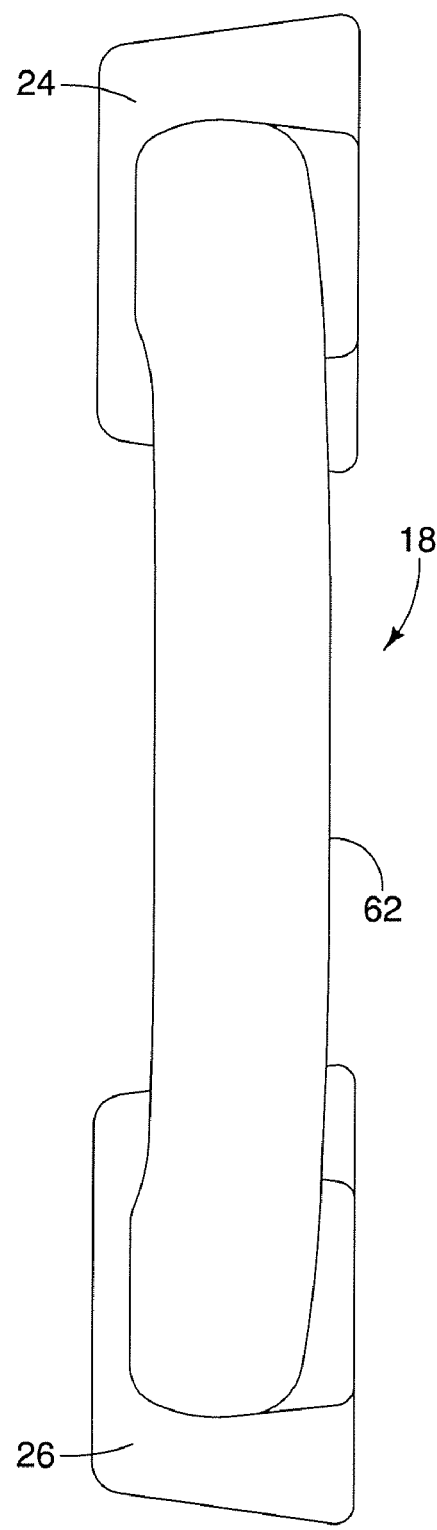
FIG. 16 is a rear elevational view of the assist grip handle with the first and second flexible gap hiders attached to the grip assist handle.
Figure 17:
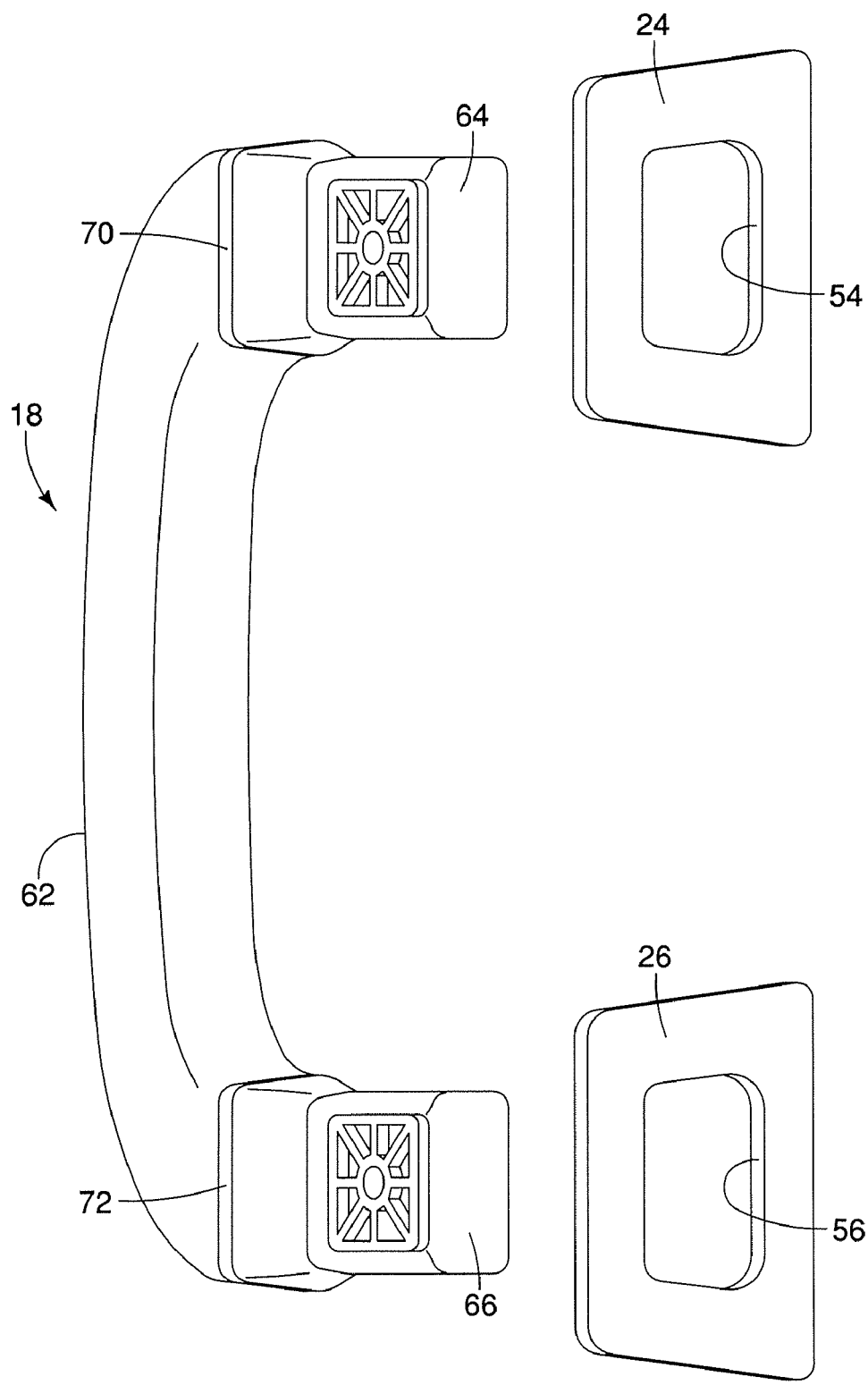
FIG. 17 is a second side perspective view of the assist grip handle with the first and second flexible gap hiders removed.
Figure 18:
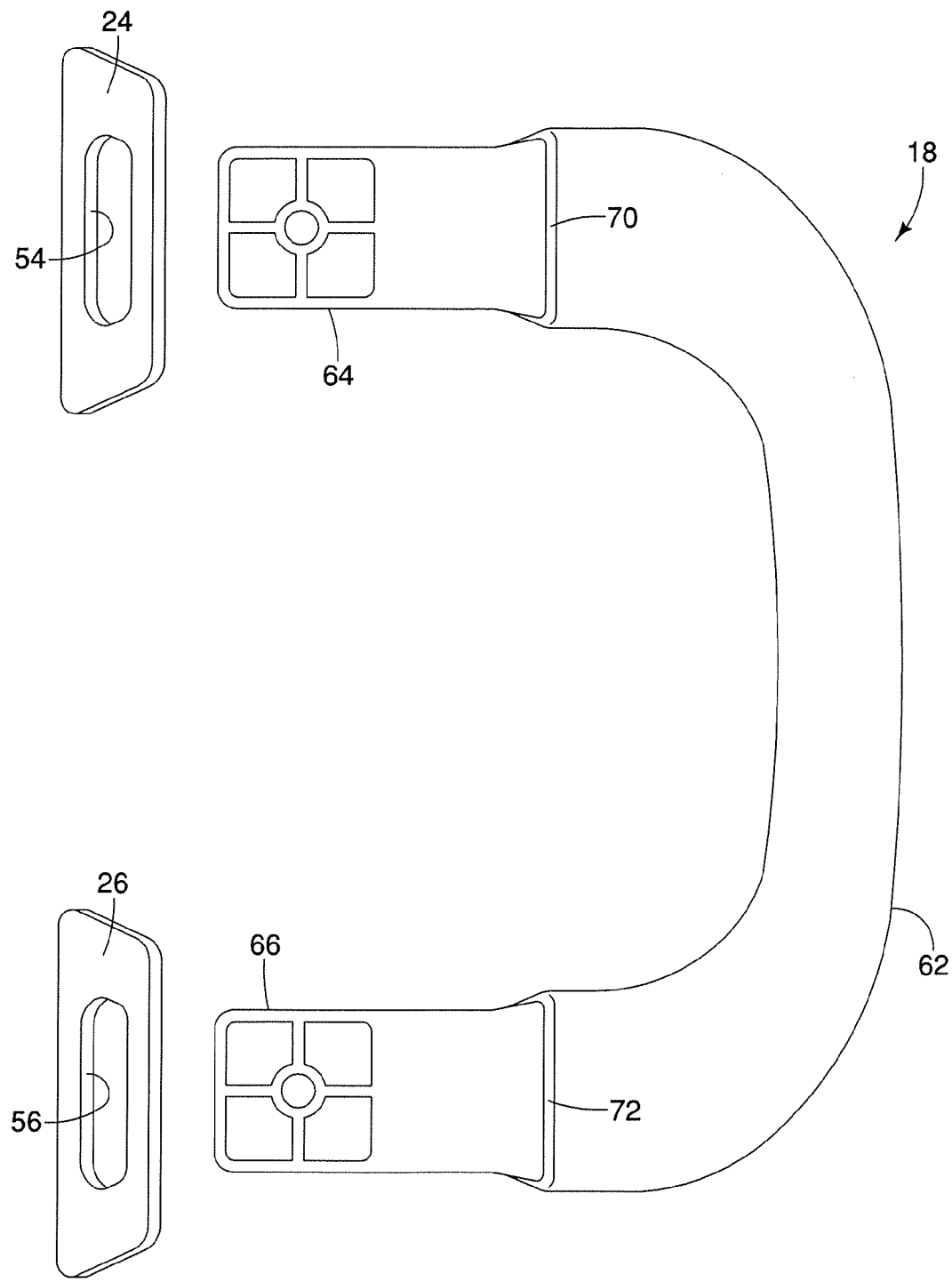
FIG. 18 is a side elevational view of the assist grip handle with the first and second flexible gap hiders removed.
Figure 19:
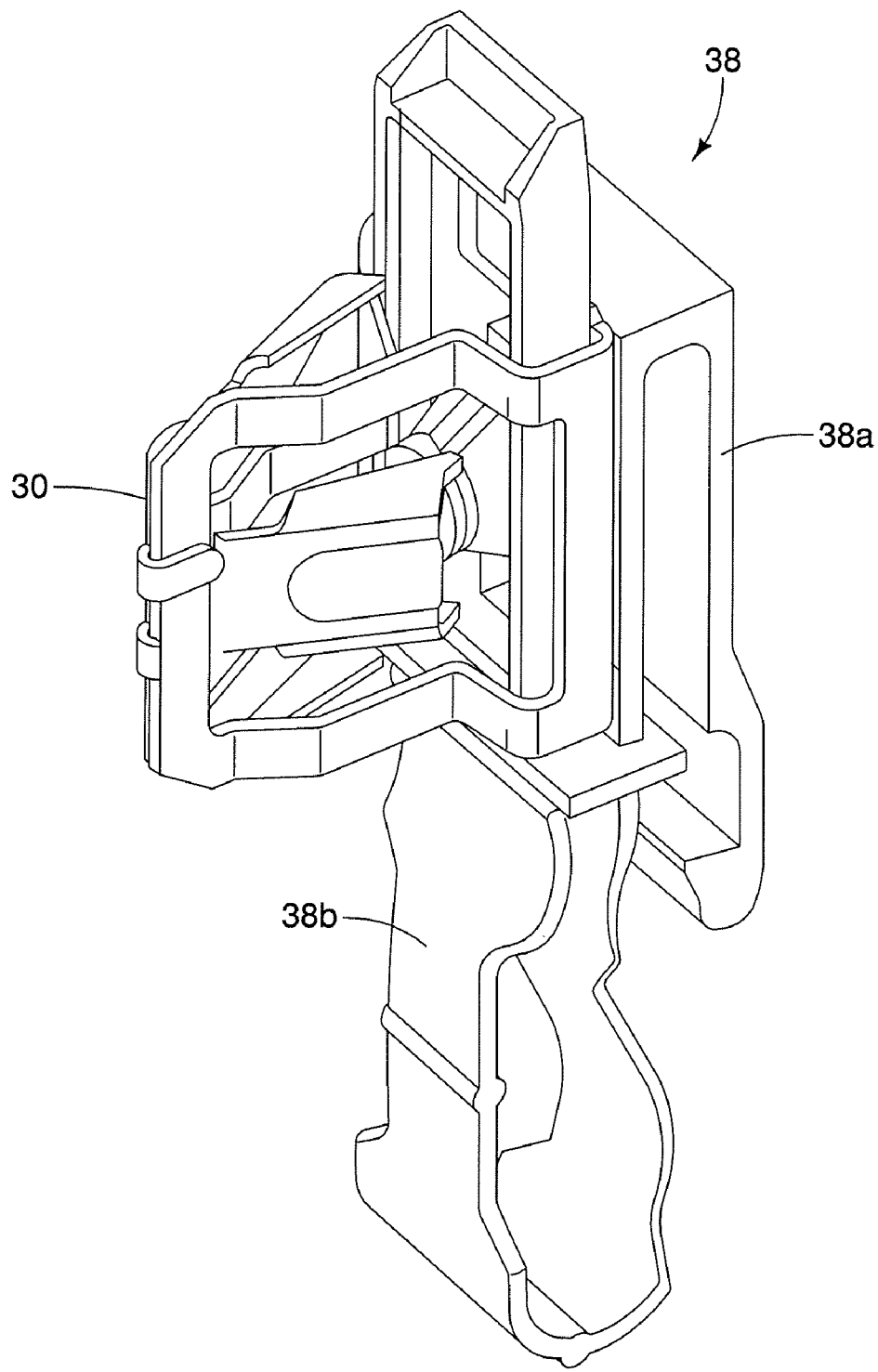
FIG. 19 is a perspective view of the integrated trim clip and tether for connecting the vehicle interior trim panel to the pillar.

As best can be seen in FIGS. 7 to 9, the trim panel 14 of is releasably secured to the pillar 16 by a pair of trim clips 30 and 32. The trim clip 30 engages a clip mating part 34 via a snap-fit, while the trim clip 32 engages a clip mating part 36. In the illustrated embodiment, the trim clip 30 is attached to the hidden backside surface 22 of the trim panel 14 by a tether part 38. Thus, as best seen in FIG. 20, the trim clip 30 and the tether part 38 form an integrated trim clip/tether. The tether part 38 is secured between a hidden backside surface 22 of the trim panel 14 and the pillar 16 to restrain the trim panel 14 from moving away from the pillar 16 by no more than a predetermined distance. When the airbag 20 is deployed during a collision, the trim clip 30 separates from a base portion 38a of the tether part 38 so that a loop portion 38b of the tether part 38 can unfolded. In other words, during deployment of the airbag 20, the trim clip 30 remains attached to the pillar 16 and the base portion 38a of the tether part 38 remains attached to the hidden backside surface 22 of the trim panel 14. However, the trim clip 30 also remains connected to the base portion 38a of the tether part 38 by the loop portion 38b of the tether part 38 which has unfolded to allow the trim panel 14 to move away from the pillar 16 by no more than a predetermined distance. The trim clip 32 is directly attached to the trim panel 14. The trim clips 30 and 32 are conventional clips that release from the clip mating parts 34 and 36 upon an application of a prescribed releasing force. When the airbag 20 is deployed, the airbag 20 applies a force that is greater than the prescribed releasing force of the trim clips 30 and 32. Preferably, the trim clips 30 and 32 mate with the clip mating parts 34 and 36 in a reinstallable manner such that the trim panel 14 can be repeatedly removed and reinstalled without the trim clips 30 and 32 and/or the clip mating parts 34 and 36 becoming damaged. Since trim clips and their clip mating parts are well known in the automotive field, the trim clips 30 and 32 and/or the clip mating parts 34 and 36 will not be illustrated and/or discussed in detail herein.

The trim panel 14 is made of a thermoplastic polymer, such as polypropylene resin. The trim panel 14 has a higher rigidity than the rigidities of the first and second flexible gap hiders 24 and 26. The term "rigid" as used herein does not require completely inflexibility, but rather the term "rigid" means self-supporting and maintaining its shape with or without a predetermined degree of flexibility. The trim panel 14 includes a first assist grip opening 44 and a second assist grip opening 46. The first and second assist grip openings 44 and 46 are formed in a peripheral edge 48 of the trim panel 14 such that the first and second assist grip openings 44 and 46 are open at the peripheral edge 48 of the trim panel 14. The assist grip handle 18 projects through the first and second assist grip openings 44 and 46.

In the illustrated embodiment, the first and second flexible gap hiders 24 and 26 are identical to each other. The first and second flexible gap hiders 24 and 26 are each formed of an elastomer. In other words, the first and second flexible gap hiders 24 and 26 are formed of a soft pliable material such as Santoprene™. Thus, the first and second flexible gap hiders 24 and 26 are more pliable than the trim panel 14. In the illustrated embodiment, the first flexible gap hider 24 has a first assist grip receiving cutout 54 that is configured to receive the assist grip handle 18. Likewise, the second flexible gap hider 26 has a second assist grip receiving cutout 56 that is configured to receive the assist grip handle 18. The first and second assist grip receiving cutouts 54 and 56 are completely enclosed hole such that first and second flexible gap hiders 24 and 26 are ring shaped members.

The first and second flexible gap hiders 24 and 26 can be attached in several different ways. For example, in the illustrated embodiment, the first and second flexible gap hiders 24 and 26 are pieces of rubber or other suitable resilient members that stretched over the assist grip handle 18 such that they are attached to the assist grip handle 18 without using a mechanical fastener and/or adhesive. Alternatively, for example, the first and second flexible gap hiders 24 and 26 can be attached to the assist grip handle 18 by using an integrated two-shot molding method. In this integrated two-shot molding method, the assist grip handle 18 is first molded and then the first and second flexible gap hiders 24 and 26 are molded directly onto the assist grip handle 18 using an integrated mold.

The first flexible gap hider 24 is attached to the assist grip handle 18 such that the first flexible gap hider 24 at least partially overlaps or covers the hidden backside surface of the trim panel 14 adjacent to an edge of the first assist grip opening 44 of the trim panel 14. Similarly, the second flexible gap hider 26 is attached to the assist grip handle 18 such that the second flexible gap hider 26 at least partially overlaps or covers the hidden backside surface 22 of the trim panel 14 adjacent to an edge of the second assist grip opening 46 of the trim panel 14. Accordingly, the first and second flexible gap hiders 24 and 26 are offset from the peripheral edge 48 of the trim panel 14 that includes the first and second assist grip openings 44 and 46. Preferably, the first and second flexible gap hiders 24 and 26 are resilient members with a prescribed amount of self-supporting and shape maintaining properties. In other words, when the trim panel 14 is installed on the pillar 16, the first and second flexible gap hiders 24 and 26 will bend and/or compress so as to conform to the hidden backside surface 22 of the trim panel 14 that are contacted by the first and second flexible gap hiders 24 and 26. Also, when the trim panel 14 is removed from the pillar 16, the first and second flexible gap hiders 24 and 26 will spring back to their original non-deformed (unstressed) state. In this manner, the trim panel 14 can be repeatedly removed from the pillar 16 and then reinstalled on the pillar 16 without adversely affecting the performance of the first and second flexible gap hiders 24 and 26. Thus, by providing the assist grip handle 18 with first and second flexible gap hiders 24 and 26, the difficulty of providing a tight fit at the interface of mating parts due to part to part variation and assembly tolerances can be solved. Also by providing the assist grip handle 18 with first and second flexible gap hiders 24 and 26, undesirable sounds that might otherwise occur by relative movement of the trim panel 14 with respect to the assist grip handle 18 due to vibrations of the vehicle 10 can be minimized.

Figure 5:
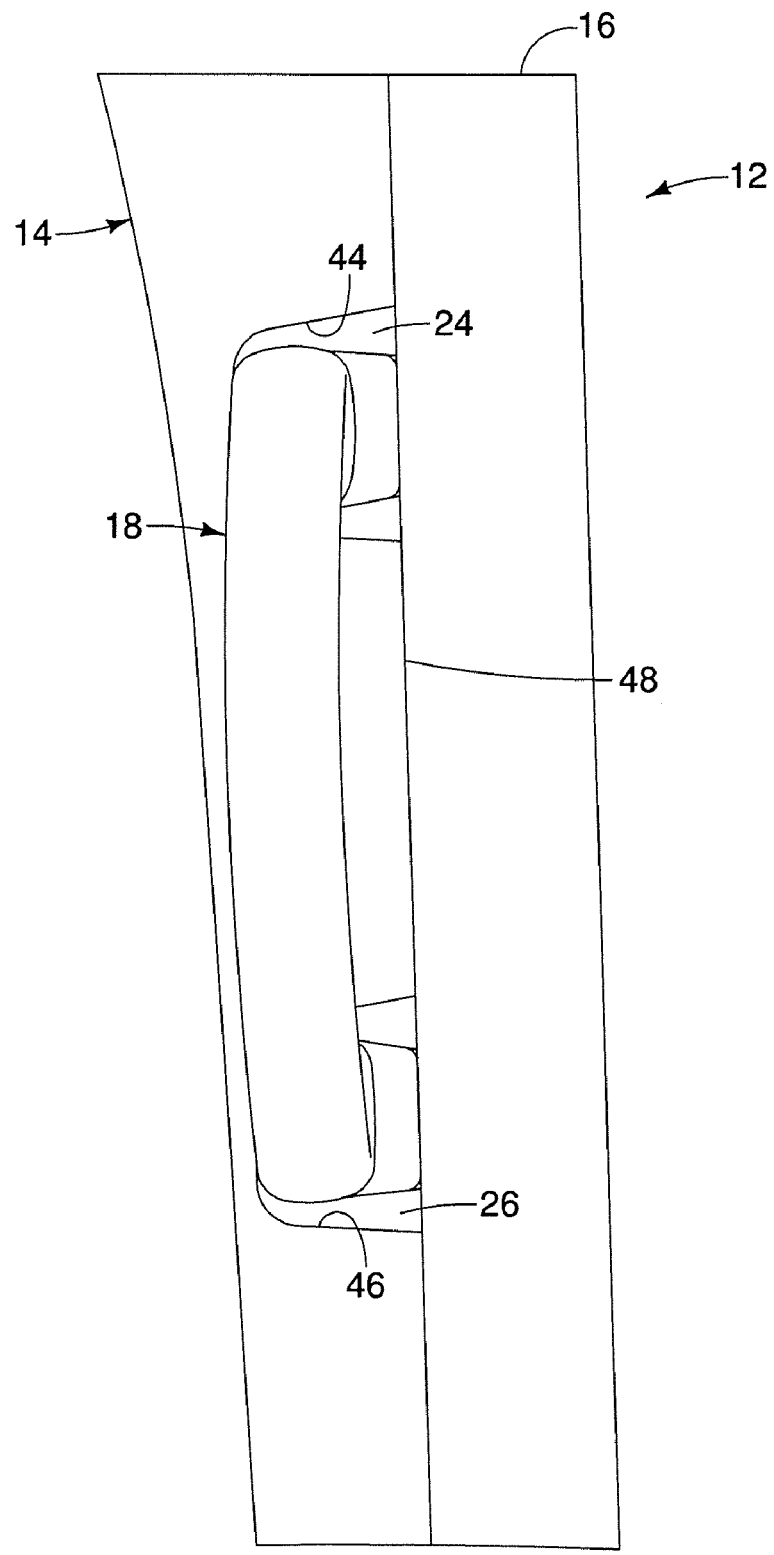
FIG. 5 is a rear side elevational view of the A-pillar of the vehicle with the assist grip handle and the vehicle interior trim panel mounted on the A-pillar of the vehicle.
Figure 6:
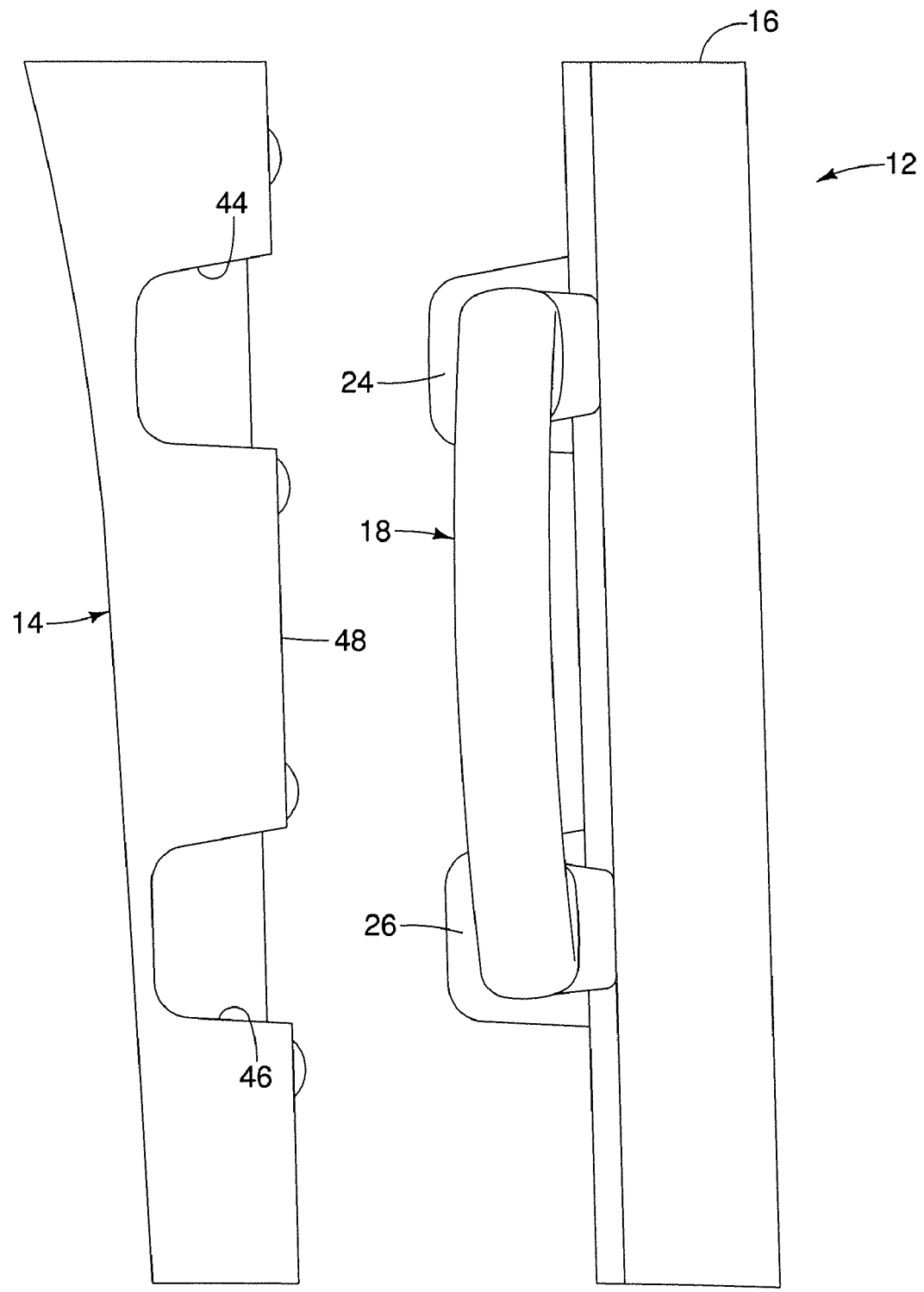
FIG. 6 is an exploded rear side elevational view of the A-pillar of the vehicle and the vehicle interior trim panel with the assist grip handle mounted on the A-pillar of the vehicle.

As seen in FIGS. 5 to 7, the pillar 16 is a structural part of the vehicle body that is made one or more pieces of sheet metal. The precise construction of the pillar 16 will vary from vehicle to vehicle. Thus, the precise construction of the pillar 16 will not be described and/or illustrated in detail herein. In the drawings, the pillar 16 is depicted as an A-pillar of the vehicle 10. Typically, A-pillars are structural portions of a vehicle located between a windshield and a vehicle door. However, it should be understood from the drawings and the description herein that the vehicle body structure 12 can be employed in other areas of the vehicle 10 such as a B-pillar or other area within the vehicle 10 where the assist grip handle 18 could be provided.

In the illustrated embodiment, as seen in FIGS. 7 to 12, the assist grip handle 18 is a shallow U-shaped member that has a gripping portion 62, a first attachment portion 64, and a second attachment portion 66. The gripping portion 62 and the attachment portions 64 and 66 constitute a one-piece, unitary grip assist body. The first and second attachment portions 64 and 66 are disposed at opposite ends of the gripping portion 62 of the grip assist body.

The first flexible gap hider 24 is attached to the first attachment portion 64 of the grip assist body. In particular, the first attachment portion 64 includes a first coupling groove 70 with the first flexible gap hider 24 being disposed in the first coupling groove 70. Preferably, the first coupling groove 70 extends completely a periphery of the first attachment portion 64 of the grip assist body. Alternatively, the first coupling groove 70 can only extend partially about the periphery of the first attachment portion 64 of the grip assist body. As mentioned above, in the illustrated embodiment, the first flexible gap hider 24 is attached to the assist grip handle 18 without using a mechanical fastener and/or adhesive. Rather, the first flexible gap hider 24 is stretched over the first attachment portion 64 such that the first flexible gap hider 24 is disposed in the first coupling groove 70. The first flexible gap hider 24 is dimensioned to completely cover a gap between the first assist grip opening 44 in the interior trim panel 14 and the first attachment portion 64 that is positioned in the first assist grip opening 44.

The second flexible gap hider 26 is attached to the second attachment portion 66 of the grip assist body. In particular, similar to the first attachment portion 64, the second attachment portion 66 includes a second coupling groove 72 with the second flexible gap hider 26 being disposed in the second coupling groove 72. The second coupling groove 72 extends completely a periphery of the second attachment portion 64 of the grip assist body. Alternatively, the second coupling groove 72 can only extend partially about the periphery of the second attachment portion 66 of the grip assist body. As mentioned above, in the illustrated embodiment, the second flexible gap hider 26 is attached to the assist grip handle 18 without using a mechanical fastener and/or adhesive. Rather, the second flexible gap hider 26 is stretched over the second attachment portion 66 such that the second flexible gap hider 26 is disposed in the second coupling groove 72. The second flexible gap hider 26 is dimensioned to completely cover a gap between the second assist grip opening 46 in the trim panel 14 and the second attachment portion 66 that is positioned in the second assist grip opening 45.

The assist grip handle 18 is formed of a rigid material, such as a hard plastic material. In the illustrated embodiment, the assist grip handle 18 is one-piece, unitary member that is formed of polypropylene resins. The first attachment portion 64 is disposed in the first assist grip opening 44 of the trim panel 14, while the second attachment portion 66 is disposed in the second assist grip opening 46 of the trim panel 14. When the trim panel 14 is installed on the pillar 16, the first and second flexible gap hiders 24 and 26 will bend and/or compress so as to conform to the hidden backside surface 22 of the trim panel 14. In the illustrated embodiment, the assist grip handle 18 is fixedly secured to the pillar 16 by a pair of fasteners 80 (e.g., two bolts). The fasteners 80 extend through apertures in the first and second attachment portions 64 and 66 and into respective threaded holes of the pillar 16.

As seen in FIG. 1, the airbag 20 is attached to an upper region of the inner pillar portion 30 in a conventional manner. The airbag 20 is a preferably a safety device that is operatively connected in a conventional manner to sensors and/or a control device (not shown) that activates the airbag 20 in response to an impact or collision in a conventional manner. Preferably, the airbag 20 is an air curtain-type device dimensioned such that when deployed in response to vehicle impact, the airbag 20 inflates to a shape similar to an inflatable mattress or the like. As indicated in FIG. 2, once deployed, the airbag 20 takes on a rectangular like-shape forming a protective cushion between a passenger and the door and side window. It should be understood from the drawings and the description herein that the airbag 20 can also be configured to form a protective cushion between the passenger and the inner part of the roof of the vehicle 10. In other words, the specific dimensions and inflated characteristics of the airbag 20 are not limited to those depicted in FIG. 2, but can be specifically chosen depending upon the dimensions and characteristics of the vehicle 10 and requirements of current and proposed safety standards.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle grip assist handle comprising:
   a grip assist body including a gripping portion and a first attachment portion, the first attachment portion including a first coupling groove; and
   a first gap hider attached to the first attachment portion of the grip assist body, the first gap hider being disposed in the first coupling groove and configured to at least partially cover a first assist grip opening in a vehicle interior trim panel when the first attachment portion of the grip assist body is positioned in the first assist grip opening.

2. The vehicle grip assist handle according to claim 1, wherein
   the first gap hider extends at least partially around a periphery of the first attachment portion of the grip assist body.

3. The vehicle grip assist handle according to claim 1, wherein
   the first coupling groove extends at least partially about a periphery of the first attachment portion of the grip assist body, with the first gap hider extending around the periphery of the first attachment portion of the grip assist body.

4. The vehicle grip assist handle according to claim 1, wherein the first gap hider is formed of an elastomer.

5. The vehicle grip assist handle according to claim 1, further comprising:
   a second gap hider attached to the grip assist body and configured to at least partially cover a second assist grip opening in the vehicle interior trim panel when the second attachment portion of the grip assist body is positioned in the second assist grip opening.

6. The vehicle grip assist handle according to claim 5, wherein
   the first and second attachment portions of the grip assist body are disposed at opposite ends of the gripping portion of the grip assist body.

7. The vehicle grip assist handle according to claim 5, wherein
   each of the first and second gap hider is formed of an elastomer.

8. The vehicle grip assist handle according to claim 5, wherein
   the second attachment portion of the grip assist body includes a second coupling groove with the second gap hider being disposed in the second coupling groove.

9. The vehicle grip assist handle according to claim 1, wherein
   the first assist grip opening is formed in a peripheral edge of the vehicle interior trim panel such that the first assist grip opening is open at the peripheral edge of the vehicle interior trim panel.

10. The vehicle grip assist handle according to claim 1, wherein
    the first attachment portion includes an aperture formed therein that is configured to receive a fastener.

11. The vehicle grip assist handle according to claim 10, wherein
    the aperture is formed in a direction that is normal to a direction that the first attachment portion extends.

12. The vehicle grip assist handle according to claim 1, wherein
    the first attachment portion and the gripping portion are unitarily formed.

13. A vehicle body structure comprising:
    a structural vehicle body section;
    a vehicle interior trim panel releasably secured to the structural vehicle body section; and
    a vehicle grip assist handle including
        a grip assist body including a gripping portion and a first attachment portion, and
        a first gap hider attached to the first attachment portion of the grip assist body, and the first gap hider at least partially covering a gap between a first assist grip opening in the vehicle interior trim panel and the first attachment portion of the grip assist body positioned in the first assist grip opening and at least partially covering a portion of a hidden backside surface of the vehicle interior trim panel that is adjacent the first assist grip opening.

14. The vehicle body structure according to claim 13, further comprising
    an airbag disposed between the vehicle interior trim panel and the structural vehicle body section.

15. The vehicle body structure according to claim 13, wherein
    the first gap hider extends at least partially around a periphery of the first attachment portion of the grip assist body.

16. The vehicle body structure according to claim 13, wherein
    the first attachment portion of the grip assist body includes a first coupling groove with the first gap hider being disposed in the first coupling groove.

17. The vehicle body structure according to claim 16, wherein
    the first coupling groove extends at least partially about a periphery of the first attachment portion of the grip assist body, with the first gap hider extending around the periphery of the first attachment portion of the grip assist body.

18. The vehicle body structure according to claim 13, wherein
    the first gap hider is formed of an elastomer.

19. The vehicle body structure according to claim 13, further comprising:
    a second gap hider attached to the grip assist body and at least partially covering a gap between a second assist grip opening in the vehicle interior trim panel and a second attachment portion of the grip assist body positioned in the second assist grip opening.

20. The vehicle body structure according to claim 19, wherein
    the first and second attachment portions of the grip assist body are disposed at opposite ends of the gripping portion of the grip assist body.

21. The vehicle body structure according to claim 19, wherein
each of the first and second gap hiders is formed of an elastomer.

22. The vehicle body structure according to claim 19, wherein
the second gap hider at least partially covers a second portion of a hidden backside surface of the vehicle interior trim panel that is adjacent the second assist grip opening.

23. The vehicle body structure according to claim 19, wherein
the first attachment portion of the grip assist body includes a first coupling groove with the first gap hider being disposed in the first coupling groove, and
the second attachment portion of the grip assist body includes a second coupling groove with the second gap hider being disposed in the second coupling groove.

24. The vehicle body structure according to claim 13, wherein
the first attachment portion includes an aperture formed therein that is configured to receive a fastener.

25. The vehicle body structure according to claim 24, wherein
the aperture is formed in a direction that is normal to a direction that the first attachment portion extends.

26. The vehicle body structure according to claim 13, wherein
the first attachment portion and the gripping portion are unitarily formed.

27. The vehicle body structure according to claim 13, wherein
the structural vehicle body section includes a pillar.

28. The vehicle body structure according to claim 13, wherein
the first gap hider contacts the structural vehicle body section.

29. A vehicle body structure comprising
a structural vehicle body section;
a vehicle interior trim panel releasably secured to the structural vehicle body section; and
a vehicle grip assist handle including
a grip assist body including a gripping portion and a first attachment portion, and
a first gap hider attached to the first attachment portion of the grip assist body and at least partially covering a gap between a first assist grip opening in the vehicle interior trim panel and the first attachment portion of the grip assist body positioned in the first assist grip opening;
wherein the first assist grip opening is formed in a peripheral edge of the vehicle interior trim panel such that the first assist grip opening is open at the peripheral edge of the vehicle interior trim panel.

30. The vehicle body structure according to claim 29, further comprising
an airbag disposed between the vehicle interior trim panel and the structural vehicle body section.

31. The vehicle body structure according to claim 29, wherein
the first gap hider extends at least partially around a periphery of the first attachment portion of the grip assist body.

32. The vehicle body structure according to claim 29, wherein
the first attachment portion of the grip assist body includes a first coupling groove with the first gap hider being disposed in the first coupling groove.

33. The vehicle body structure according to claim 32, wherein
the first coupling groove extends at least partially about a periphery of the first attachment portion of the grip assist body, with the first gap hider extending around the periphery of the first attachment portion of the grip assist body.

34. The vehicle body structure according to claim 29, wherein
the first gap hider is formed of an elastomer.

35. The vehicle body structure according to claim 29, wherein
the first gap hider at least partially covers a portion of a hidden backside surface of the vehicle interior trim panel that is adjacent the first assist grip opening.

36. The vehicle body structure according to claim 29, wherein
the first attachment portion includes an aperture formed therein that is configured to receive a fastener.

37. The vehicle body structure according to claim 36, wherein
the aperture is formed in a direction that is normal to a direction that the first attachment portion extends.

38. The vehicle body structure according to claim 29, wherein
the first attachment portion and the gripping portion are unitarily formed.

39. The vehicle body structure according to claim 29, wherein
the structural vehicle body section includes a pillar.

40. The vehicle body structure according to claim 29, wherein
the first gap hider contacts the structural vehicle body section.

* * * * *